(12) United States Patent
Nishimine (10) Patent No.: US 10,197,151 B2
(45) Date of Patent: Feb. 5, 2019

(54) POWER TRANSMISSION SYSTEM FOR VEHICLE

(71) Applicant: TOYOTA JIDOSHA KABUSHIKI KAISHA, Toyota-shi, Aichi-ken (JP)

(72) Inventor: Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 15/362,490

(22) Filed: Nov. 28, 2016

(65) Prior Publication Data

US 2017/0167596 A1 Jun. 15, 2017

(30) Foreign Application Priority Data

Dec. 9, 2015 (JP) .................................. 2015-240645

(51) Int. Cl.
*F16H 57/04* (2010.01)
*B60K 6/365* (2007.10)
(Continued)

(52) U.S. Cl.
CPC ..... *F16H 57/0435* (2013.01); *F16H 57/0441* (2013.01); *F16H 57/0442* (2013.01); *F16H 57/0476* (2013.01); *B60K 6/365* (2013.01); *B60K 6/44* (2013.01); *B60K 6/543* (2013.01); *B60Y 2200/92* (2013.01); *B60Y 2306/03* (2013.01); *F16H 3/728* (2013.01);
(Continued)

(58) Field of Classification Search
CPC ............. F16H 57/0435; F16H 57/0441; F16H 57/0442; F16H 57/0476; F16H 3/728; F16H 2200/2007; B60K 6/365; B60K 6/44; B60K 6/543; B60K 2200/92; B60K 2306/03; Y10S 903/911; Y10S 903/918
See application file for complete search history.

(56) References Cited

U.S. PATENT DOCUMENTS 7,951,043 B2 * 5/2011 Reisch ................ F16H 57/0434
192/113.3
8,702,562 B2 * 4/2014 Zhang ................... B60W 10/06
477/52
(Continued)

FOREIGN PATENT DOCUMENTS

CN 103851170 A 6/2014
JP S54-139121 A 10/1979
(Continued)

*Primary Examiner* — Michael A Riegelman
(74) *Attorney, Agent, or Firm* — Oliff PLC (57) ABSTRACT

By providing an auxiliary check valve in parallel with a check valve installed in an electric oil pump, it is possible to measure an oil temperature even when the check valve is stuck. A flow resistance of an oil passage of the auxiliary check valve is set so as to be larger than that of the check valve, and a minimum valve open pressure difference of the auxiliary check valve is set so as to be smaller than that of the check valve. Thus, it is possible to further accurately measure an oil temperature and determine a fault. By using a rotation speed of the electric oil pump and an oil temperature in determining whether there is a fault in the electric oil pump or in the oil passage, it is possible to reduce the influence of variations, or the like, in measurement of a temperature sensor.

3 Claims, 7 Drawing Sheets

(51) Int. Cl.
*B60K 6/44* (2007.10)
*B60K 6/543* (2007.10)
*F16H 3/72* (2006.01)

(52) U.S. Cl.
CPC ... *F16H 2200/2007* (2013.01); *Y10S 903/911* (2013.01); *Y10S 903/918* (2013.01)

(56) References Cited

U.S. PATENT DOCUMENTS

| | | | | |
|---|---|---|---|---|
| 8,840,524 B2* | 9/2014 | Arsenault | ............. | B60W 10/06 |
| | | | | 477/5 |
| 9,702,381 B2* | 7/2017 | Morita | ............... | F16H 61/0031 |
| 9,863,528 B2* | 1/2018 | Hwang | ............. | F16H 61/0206 |
| 9,989,148 B2* | 6/2018 | Ogata | ................ | F16H 61/0021 |
| 2002/0091034 A1* | 7/2002 | Nakamori | ............. | B60K 6/485 |
| | | | | 477/3 |
| 2002/0107103 A1* | 8/2002 | Nakamori | ............. | B60K 6/365 |
| | | | | 475/116 |
| 2004/0029677 A1* | 2/2004 | Mori | ...................... | B60K 6/485 |
| | | | | 477/3 |
| 2005/0064975 A1* | 3/2005 | Takagi | ................ | F16H 61/0031 |
| | | | | 475/101 |
| 2009/0241883 A1* | 10/2009 | Nagoshi | .................. | F02N 11/0825 |
| | | | | 123/179.4 |
| 2011/0095714 A1* | 4/2011 | Kagawa | .................. | F01C 20/00 |
| | | | | 318/400.21 |
| 2011/0129356 A1* | 6/2011 | Kobayashi | ............. | F04C 2/102 |
| | | | | 417/44.1 |
| 2011/0166727 A1* | 7/2011 | Light | ..................... | B60K 6/445 |
| | | | | 701/22 |
| 2011/0269583 A1* | 11/2011 | Kawakami | .......... | F16H 61/0031 |
| | | | | 474/28 |
| 2013/0171008 A1* | 7/2013 | Uda | ........................ | F04B 49/06 |
| | | | | 417/44.2 |
| 2013/0253744 A1* | 9/2013 | Nishimine | ............ | B60W 10/08 |
| | | | | 701/22 |
| 2014/0158467 A1* | 6/2014 | Kimura | .................. | F01M 11/10 |
| | | | | 184/6.22 |
| 2015/0051768 A1* | 2/2015 | Miyamoto | ............ | B60W 20/00 |
| | | | | 701/22 |
| 2016/0069231 A1* | 3/2016 | Nishimine | .............. | B60L 11/00 |
| | | | | 701/22 |
| 2017/0167596 A1* | 6/2017 | Nishimine | .......... | F16H 57/0476 |
| 2018/0010595 A1* | 1/2018 | Goto | ..................... | F04B 49/022 |
| 2018/0073395 A1* | 3/2018 | Parnin | ..................... | F01D 15/12 |
| 2018/0106360 A1* | 4/2018 | Gmirya | ..................... | F16H 57/04 |
| 2018/0264927 A1* | 9/2018 | Komada | ................. | B60K 6/387 |

FOREIGN PATENT DOCUMENTS

| | | |
|---|---|---|
| JP | H08-178805 A | 7/1996 |
| JP | 2004-011819 A | 1/2004 |
| JP | 2004-068732 A | 3/2004 |
| JP | 2005-090659 A | 4/2005 |
| JP | 2010-139028 A | 6/2010 |
| JP | 2011-000978 A | 1/2011 |
| JP | 2013-057342 A | 3/2013 |
| JP | 2013-137069 A | 7/2013 |
| JP | 2014-114823 A | 6/2014 |

\* cited by examiner

POWER TRANSMISSION SYSTEM FOR VEHICLE

INCORPORATION BY REFERENCE

The disclosure of Japanese Patent Application No. 2015-240645 filed on Dec. 9, 2015 including the specification, drawings and abstract is incorporated herein by reference in its entirety.

BACKGROUND

1. Technical Field

The embodiment relates to a power transmission system for a vehicle and, more particularly, to a technique for enabling measurement of the temperature of oil for lubrication and cooling even when there occurs a fault in a check valve provided in an electric oil pump.

2. Description of Related Art

For example, there is known a vehicle, such as a hybrid vehicle. The vehicle includes an electric oil pump and a mechanical oil pump that are provided in an oil passage in parallel with each other. The electric oil pump operates by electric power supplied. The mechanical oil pump is directly driven by an engine to rotate. In the vehicle, oil is supplied from one of those electric oil pump and mechanical oil pump to a power transmission system for a vehicle. Generally, the mechanical oil pump is driven by the engine, so the electric oil pump is started up during a stop of the engine. These electric oil pump and mechanical oil pump each include a check valve, and are configured to reduce interference of hydraulic pressure with each other. In order to enable detection of oil temperature even in a state where oil does not sufficiently circulate, a technique for installing an oil temperature sensor vertically downward of an oil introduction portion of an oil supply object is described in Japanese Patent Application Publication No. 2014-114823 (JP 2014-114823 A).

With the oil temperature sensor described in JP 2014-114823 A, a single sensor is able to measure the oil temperature even while the vehicle is traveling in EV mode. The oil temperature sensor is installed inside a transaxle case, so there is no deviation between an oil temperature inside the transaxle case and a value of the oil temperature sensor. However, when the check valve installed in the electric oil pump is stuck, circulation of oil is impeded, so there is an inconvenience that it is not possible to accurately measure an oil temperature inside the transaxle case.

SUMMARY

The embodiment provides a power transmission system that is able to correctly measure an oil temperature inside a transaxle since oil circulates even when a check valve installed in an electric oil pump is stuck, and to reduce erroneous determination in determining whether there is a fault in the electric oil pump.

An aspect of the embodiment provides a power transmission system for a vehicle. The power transmission system includes: an electric oil pump; a mechanical oil pump connected in parallel with the electric oil pump; a first check valve provided in a discharge oil passage of the electric oil pump; a second check valve provided in a discharge oil passage of the mechanical oil pump; an oil temperature sensor provided at a merging point downstream of the first check valve and the second check valve; and a third check valve provided at a position upstream of the oil temperature sensor in parallel with the first check valve.

According to the aspect of the embodiment, by providing the third check valve in parallel with the first check valve connected to the electric oil pump, oil circulates even when the first check valve is stuck. Thus, it is possible to correctly detect an oil temperature inside a transaxle case with the use of the oil temperature sensor downstream of the third check valve.

In the aspect of the embodiment, a flow resistance of an oil passage in which the third check valve is provided may be larger than a flow resistance of an oil passage in which the first check valve is provided.

With the above configuration, the flow resistance of the oil passage in which the third check valve is provided is set so as to be larger than the flow resistance of the oil passage in which the first check valve is provided, so, when a load larger than usual is exerted on the electric oil pump in a state where the first check valve is stuck, the rotation speed of the electric oil pump becomes lower than usual. Thus, it is possible to vary the rotation speed of the electric oil pump for the same oil temperature between a normal state and a stuck state, so it is possible to determine a stuck abnormality.

A minimum valve open pressure difference of the third check valve may be smaller than a minimum valve open pressure difference of the first check valve.

With the above configuration, since the minimum valve open pressure difference of the third check valve is set so as to be smaller than the minimum valve open pressure difference of the first check valve, even when there occurs a fault in operation of the electric oil pump and the first check valve does not open due to a decrease in hydraulic pressure, oil circulates as a result of opening of the third check valve, so it is possible to correctly detect an oil temperature inside the transaxle case with the oil temperature sensor downstream of the third check valve.

In the above configuration, the power transmission system may further include an electronic control unit configured to, when a rotation speed of the electric oil pump is lower than a predetermined fault determination rotation speed, determine that there is a fault in the electric oil pump or an oil passage in which the first check valve is provided, the predetermined fault determination rotation speed being a rotation speed higher than a rotation speed of the electric oil pump for an oil temperature that is measured by the oil temperature sensor at the time when the electric oil pump normally operates and oil is being normally supplied through an oil passage that passes through the third check valve from the electric oil pump to the oil temperature sensor in a state where the first check valve is not open and the third check valve is open, and the predetermined fault determination rotation speed being a rotation speed lower than a rotation speed of the electric oil pump for an oil temperature that is measured by the oil temperature sensor at the time when the electric oil pump normally operates and oil is being normally supplied through an oil passage that passes through the first check valve from the electric oil pump to the oil temperature sensor in a state where the first check valve is open.

With the above configuration, there is provided means for determining that there is an inconvenience in the electric oil pump or the oil passage in which the first check valve is provided when the rotation speed of the electric oil pump is lower than the predetermined rotation speed, the predetermined rotation speed is a rotation speed higher than the rotation speed of the electric oil pump for an oil temperature detected by the temperature sensor at the time when the first check valve is not open, the third check valve is open, the electric oil pump normally operates and oil is being normally supplied through the third check valve, and the predetermined rotation speed is a rotation speed lower than the rotation speed of the electric oil pump for an oil temperature detected by the temperature sensor at the time when the first check valve is open, the electric oil pump normally operates and oil is being normally supplied through the first check valve. When a temperature detected by the oil temperature sensor is different from an actual oil temperature, for example, when a temperature detected by the temperature sensor is higher than an actual temperature, it is not determined as fault conditions when the rotation speed exceeds a predetermined rotation speed for the detected oil temperature. When a temperature detected by the temperature sensor is lower than an actual temperature, it is determined as fault conditions when the rotation speed is lower than or equal to the predetermined rotation speed, so it is not erroneously determined as normal conditions. Therefore, by carrying out the above-described determination, it is possible to avoid unnecessary erroneous determination due to variations, or the like, in temperature detected by the oil temperature sensor.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described in detail with reference to the accompanying drawings.

Figure 1:
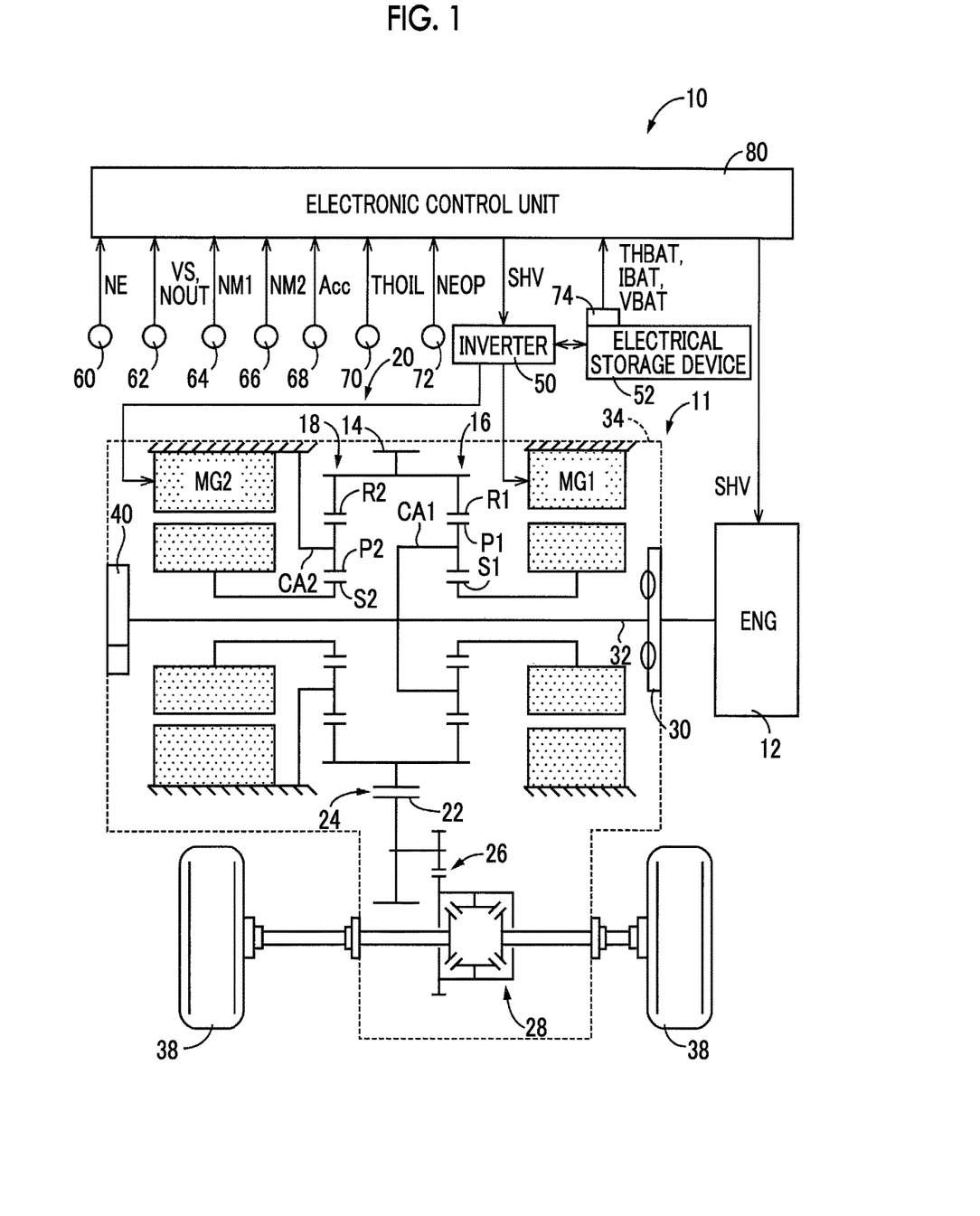
FIG. 1 is a skeletal view that illustrates the configuration of an electronic control unit and vehicle power transmission system, which are provided in a vehicle to which the embodiment is applied.

FIG. 1 is a view that illustrates the schematic configuration of a vehicle power transmission system 11 (hereinafter, referred to as power transmission system 11) of a hybrid vehicle 10 (hereinafter, referred to as vehicle 10) to which the embodiment is applied, and is a view that illustrates an electronic control unit (ECU) 80 provided in order to control portions of the power transmission system 11. As shown in FIG. 1, the power transmission system 11 includes a transmission unit 20. The transmission unit 20 includes a power distribution mechanism 16, a gear mechanism 18 and a second electric motor MG2. The power distribution mechanism 16 distributes power, which is output from an engine 12, to a first electric motor MG1 and an output gear 14. The engine 12 serves as a driving force source for propelling the vehicle 10. The gear mechanism 18 is coupled to the output gear 14. The second electric motor MG2 is coupled to the output gear 14 via the gear mechanism 18 so as to be able to transmit power to the output gear 14. The transmission unit 20 is, for example, suitably used in a front-engine front-drive (FF) vehicle in which the transmission unit 20 is horizontally arranged in the vehicle 10. A counter gear pair 24, a final gear pair 26, a differential gear unit (final reduction gear) 28, a damper 30, an input shaft 32, and the like, constitute part of the power transmission system 11 as a transaxle (T/A) inside a case 34. The counter gear pair 24 includes the output gear 14 and a counter driven gear 22. The output gear 14 serves as an output rotating member of the transmission unit 20 (power distribution mechanism 16). The damper 30 is operatively coupled to the engine 12. The input shaft 32 is operatively coupled to the damper 30. The case 34 serves as a non-rotating member connected to a vehicle body. In the thus configured power transmission system 11, the power of the engine 12, which is input via the damper 30 and the input shaft 32, or the power of the second electric motor MG2 is transmitted to the output gear 14, and is then transmitted from the output gear 14 to a pair of drive wheels 38 sequentially via the counter gear pair 24, the final gear pair 26, the differential gear unit 28, a pair of axles, and the like.

One end of the input shaft 32 is coupled to the engine 12 via the damper 30, and the other end of the input shaft 32 is coupled to a mechanical oil pump 40. The mechanical oil pump 40 serves as a lubricating oil supply device. The mechanical oil pump 40 is directly driven by the engine 12 to rotate, and oil (lubricating oil) is supplied to portions in the power transmission system 11, such as the first electric motor MG1, the second electric motor MG2, the power distribution mechanism 16, the gear mechanism 18 and ball bearings (not shown).

The power distribution mechanism 16 is a known single pinion planetary gear train, and includes a first sun gear S1, first pinion gears P1, a first carrier CA1 and a first ring gear R1 as rotating elements (rotating members). The first carrier CA1 supports the first pinion gears P1 such that each pinion gear P1 is rotatable and revolvable. The first ring gear R1 is in mesh with the first sun gear S1 via the first pinion gears P1. The power distribution mechanism 16 functions as a differential mechanism that performs differential action. In the power distribution mechanism 16, the first carrier CA1 as a first rotating element is coupled to the input shaft 32, that is, the engine 12, the first sun gear S1 as a second rotating element is coupled to the first electric motor MG1, and the first ring gear R1 as a third rotating element is coupled to the output gear 14. Thus, each of the first sun gear S1, the first carrier CA1 and the first ring gear R1 is relatively rotatable with respect to one another. For this reason, the output of the engine 12 is distributed to the first electric motor MG1 and the output gear 14, and the first electric motor MG1 generates electric energy by using the output of the engine 12, distributed to the first electric motor MG1. The generated electric energy is stored in an electrical storage device 52 via an inverter 50, or the second electric motor MG2 is driven by using the electric energy to rotate. Therefore, the transmission unit 20 is placed in, for example, a continuously variable transmission state (electric CVT state), and functions as an electrical continuously variable transmission of which a speed ratio γ0 (=Engine rotation speed NE/Output rotation speed NOUT) is continuously varied. That is, the transmission unit 20 functions as an electric differential unit (electric continuously variable transmission) by which the differential state of the power distribution mechanism 16 is controlled by controlling the operating state of the first electric motor MG1 that functions as a differential electric motor. Thus, the transmission unit 20 is, for example, able to operate the engine 12 at an optimal fuel efficiency point that is an operating point of the engine 12 (an operating point indicating the operating state of the engine 12, which is determined by, for example, an engine rotation speed NE and an engine torque TE; hereinafter, referred to as engine operating point), at which fuel efficiency is the highest.

The gear mechanism 18 is a known single pinion planetary gear train, and includes a second sun gear S2, second pinion gears P2, a second carrier CA2 and a second ring gear R2 as rotating elements. The second carrier CA2 supports the second pinion gears P2 such that each second pinion gear P2 is rotatable and revolvable. The second ring gear R2 is in mesh with the second sun gear S2 via the second pinion gears P2. In the gear mechanism 18, the second carrier CA2 is coupled to the case 34 that is the non-rotating member and is stopped from rotating, the second sun gear S2 is coupled to the second electric motor MG2, and the second ring gear R2 is coupled to the output gear 14. A gear ratio (Gear ratio=Number of teeth of the sun gear S2/Number of teeth of the ring gear R2) of the planetary gear train of the gear mechanism 18 is configured such that the gear mechanism 18 functions as, for example, a reduction gear. During power running for outputting torque (driving force) from the second electric motor MG2, the rotation of the second electric motor MG2 is reduced and then transmitted to the output gear 14, and the torque of the second electric motor MG2 is increased and then transmitted to the output gear 14. The output gear 14 is a composite gear in which the function of the ring gear R1 of the power distribution mechanism 16, the function of the ring gear R2 of the gear mechanism 18 and the function of the counter drive gear that is in mesh with the counter driven gear 22 and constitutes the counter gear pair 24 are integrated as one gear, and functions as an output member.

Each of the first electric motor MG1 and the second electric motor MG2 is, for example, a synchronous motor that has at least one of the function of a motor for generating mechanical driving force from electric energy and the function of a generator for generating electric energy from mechanical driving force, and is suitably a motor generator that is selectively operated as the motor or the generator. For example, the first electric motor MG1 has a generator function for taking charge of reaction force against the engine 12 and a motor function for driving the engine 12 to rotate during a stop of the engine 12, while the second electric motor MG2 has a motor function for functioning as a drive electric motor that outputs driving force as a driving force source for propelling the vehicle 10 and a generator function for generating electric energy through regeneration from reverse driving force transmitted from the drive wheels 38 side. The thus configured transmission unit 20 or power transmission system 11 functions as an electrical continuously variable transmission.

Figure 2:
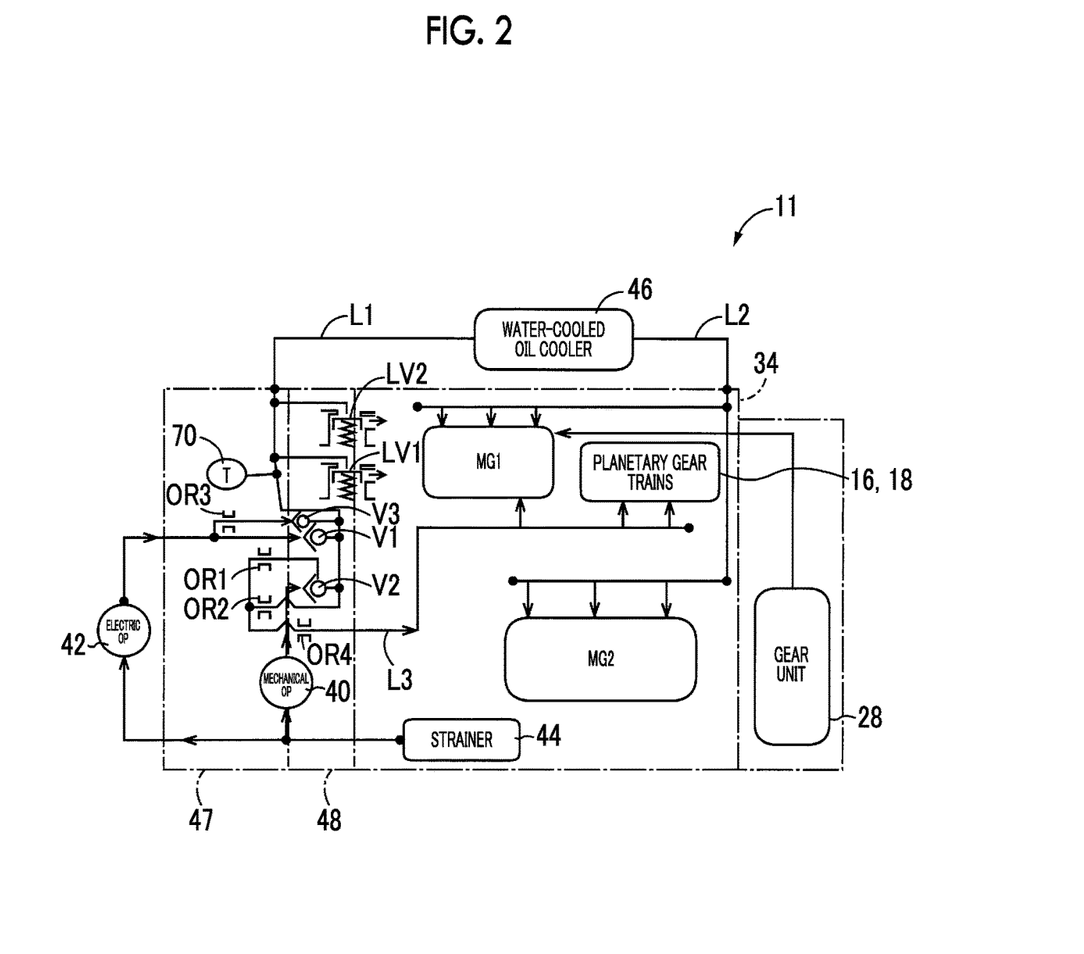
FIG. 2 is a view that illustrates a lubricating oil passage provided in the vehicle power transmission system shown in FIG. 1.
Figure 3A:
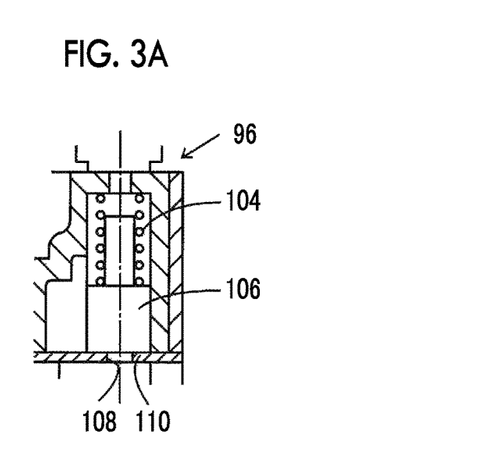
FIG. 3A to FIG. 3D are views, each of which illustrates a relevant portion of a check valve shown in FIG. 2.
Figure 3B:
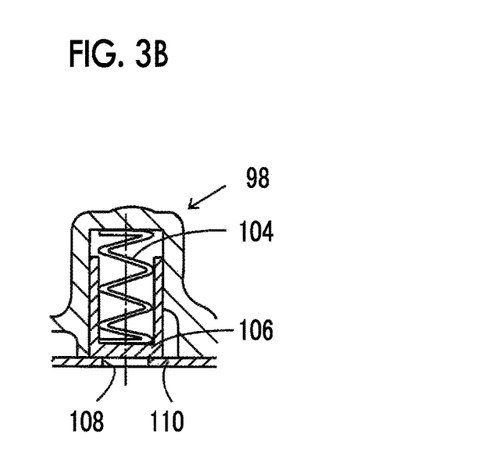
Figure 3C:
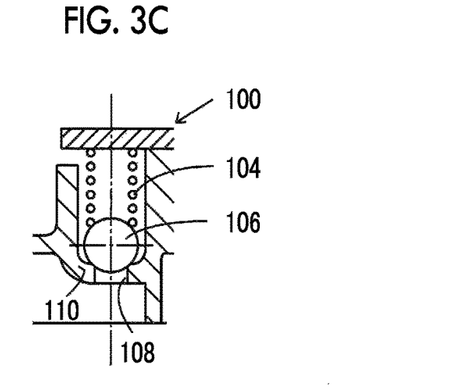
Figure 3D:
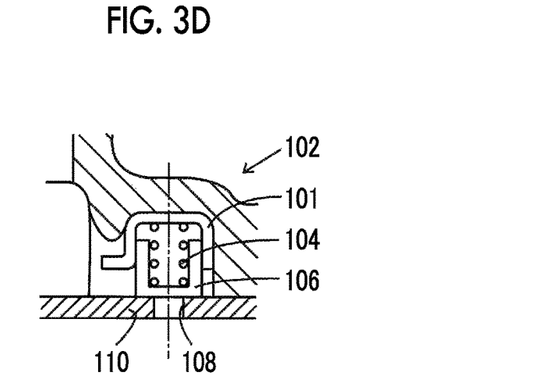

FIG. 2 is a view that illustrates an oil passage for supplying oil to lubricate at least part of various rotating bodies provided in the power transmission system 11, such as the first pinion gears P1 of the power distribution mechanism 16 and the second pinion gears P2 of the gear mechanism 18 and an oil passage for supplying oil to cool or lubricate the first electric motor MG1 and the second electric motor MG2. Oil scooped up by the differential gear unit 28 to an upper portion inside the case 34 during vehicle traveling is supplied to the first electric motor MG1, the second electric motor MG2, a counter gear mechanism that constitutes the counter gear pair 24, bearings of the counter gear mechanism, and the like. One end of the case 34 is closed by a rear cover 47, and a pump cover 48 of the mechanical oil pump 40 is fixed to the rear cover 47.

An electric oil pump 42 is a pump that is driven on the basis of electric power, such as a motor pump that is arranged outside the case 34 and that is driven by an exclusive motor to rotate and an electromagnetic pump that is reciprocated by an electromagnetic vibrator. The electric oil pump 42 is operated during a stop of the engine 12. The electric oil pump 42 may be arranged inside the case 34. The electric oil pump 42 is connected in parallel with the mechanical oil pump 40. Each of the mechanical oil pump 40 and the electric oil pump 42 introduces oil, circulated inside the case 34, via a strainer 44, merges the introduced oil through a corresponding one of a second check valve V2 and a first check valve V1, and then supplies the oil to the first electric motor MG1 and the second electric motor MG2 through a first oil passage L1, a water-cooled oil cooler 46 and a second oil passage L2. Each of the first check valve V1 and the second check valve V2 is configured to also output oil to a third oil passage L3 provided in the input shaft 32. Oil is supplied to the first electric motor MG1, the power distribution mechanism 16 and the gear mechanism 18 through the third oil passage L3. The third oil passage L3 has two throttles OR1 or OR2 and OR4. Oil that has passed through the first check valve V1 from the electric oil pump 42 passes through the throttle OR2, further passes through the throttle OR4, and is then supplied to the third oil passage L3. Oil from the mechanical oil pump 40, which has passed through the second check valve V2, merges after passing through the throttle OR1 or the throttle OR2, further passes through the throttle OR4, and is then supplied to the third oil passage L3. The oil is supplied to the first electric motor MG1, the power distribution mechanism 16 and the gear mechanism 18 through the third oil passage L3. Since the first pinion gears P1 of the power distribution mechanism 16 and the second pinion gears P2 of the gear mechanism 18 rotate at a high speed, poor lubrication tends to occur. An oil temperature sensor 70 is provided in the first oil passage L1, and a pair of relief valves LV1, LV2 for limiting an increase in pressure are provided in the first oil passage L1. A third check valve V3 is provided between the electric oil pump 42 and the oil temperature sensor 70 in parallel with the first check valve V1. A throttle OR3 is further provided in an oil passage in which the third check valve V3 is provided. A minimum valve open pressure difference (MPa) of the third check valve V3 is set so as to be smaller than a minimum valve open pressure difference (MPa) of the first check valve V1.

Usually, oil is fed from the mechanical oil pump 40 or the electric oil pump 42 to the oil passage L1. While the engine 12 is being driven, oil is fed to the oil passage L1 via the second check valve V2 by the mechanical oil pump 40. While the engine 12 is stopped, oil is fed to the oil passage L1 via the first check valve V1 by the electric oil pump 42. However, for example, when the first check valve V1 is stuck, when the oil passage in which the first check valve V1 is provided clogs, or when the viscosity of oil is high due to a low temperature, oil is not sufficiently fed from the electric oil pump 42 to the oil passage L1. In this case, since oil is also not fed to the oil temperature sensor 70, it is not possible to measure a correct oil temperature. The third check valve V3 also operates when oil is not sufficiently fed due to a fault, such as sticking of the first check valve V1, so oil is fed to the oil passage L1 and the oil temperature sensor 70, with the result that it is possible to measure the temperature of oil even when there is a fault, such as sticking of the first check valve V1 and clogging of the oil passage.

FIG. 3A, FIG. 3B, FIG. 3C and FIG. 3D respectively show a poppet valve 96, a cup-type valve 98, a ball-type valve 100 and a valve 102 with an exclusive case 101, which are generally used as a check valve. Each valve is configured such that a valve hole 108 is closed at the time when a valve element 106 urged by a spring 104 is seated on a valve seat 110 in which the valve hole 108 is provided. The ball-type valve 100 or the valve 102 with the exclusive case 101, in which a fault, such as valve sticking and involvement of foreign substance, rarely occurs is often used as a so-called check valve that is used at the time when there is a fault in another check valve, like the third check valve V3.

For example, the resistance of the oil passage is increased by providing the throttle OR3 in the oil passage in which the third check valve V3 is provided or a valve having a large resistance is selected as the third check valve V3. Thus, the resistance of the oil passage in which the third check valve V3 is provided is made larger than the resistance of the oil passage in which the first check valve V1 is provided. Thus, even when the first check valve V1 is stuck, it is possible to further stabilize the operation of the electric oil pump, so it is possible to determine whether there is a fault in the electric oil pump under a further stable condition.

The minimum valve open pressure difference (MPa) of the third check valve V3 is set so as to be smaller than the minimum valve open pressure difference (MPa) of the first check valve V1. Thus, even when there occurs an inconvenience in the electric oil pump and, as a result, the first check valve V1 does not open because of a decrease in hydraulic pressure, oil circulates as a result of opening of the third check valve V3, so it is possible to correctly detect an oil temperature inside the transaxle case with the use of the oil temperature sensor downstream of the third check valve V3.

Referring back to FIG. 1, the vehicle 10 includes the electronic control unit (ECU) 80 as a controller for the vehicle 10, which controls the portions of the vehicle 10, such as the transmission unit 20. The electronic control unit 80 is, for example, formed of a so-called microcomputer including a CPU, a RAM, a ROM, input/output interfaces, and the like. The CPU executes various control over the vehicle 10 by carrying out signal processing in accordance with programs stored in the ROM in advance while utilizing the temporary storage function of the RAM. For example, the electronic control unit 80 is configured to execute vehicle control, such as hybrid drive control associated with the engine 12, the first electric motor MG1, the second electric motor MG2, and the like. Where necessary, the electronic control unit 80 is divided into an electronic control unit for controlling the output of the engine 12, an electronic control unit for controlling the output of the electric motors MG1, MG2, and the like. Various input signals are input to the electronic control unit 80. The various input signals are detected by sensors provided in the vehicle 10. The sensors include, for example, a crank position sensor 60, an output rotation speed sensor 62, a first electric motor rotation speed sensor 64, such as a resolver, a second electric motor rotation speed sensor 66, such as a resolver, an accelerator operation amount sensor 68, the oil temperature sensor 70, an electric oil pump rotation speed sensor 72, a battery sensor 74, and the like. The various input signals include, for example, an engine rotation speed NE (rpm), an output rotation speed NOUT (rpm) that is the rotation speed of the output gear 14, corresponding to the vehicle speed VS (km/h), a first electric motor rotation speed NM1 (rpm), a second electric motor rotation speed NM2 (rpm), an accelerator operation amount Acc (%), an oil temperature (lubricating oil temperature) THOIL (° C.), a rotation speed NEOP (rpm) of the electric oil pump 42, a battery temperature THBAT (° C.), battery charging and discharging current IBAT (I) and battery voltage VBAT (V) of the electrical storage device 52, and the like. Various output signals are output from the electronic control unit 80 to the devices provided in the vehicle 10. The devices include, for example, the engine 12, the inverter 50, and the like. The various output signals include, for example, a hybrid control command signal SHV, such as an engine control command signal and an electric motor control command signal (shift control command signal), and the like. The electronic control unit 80, for example, sequentially calculates the state of charge (charged capacity) SOC of the electrical storage device 52 on the basis of the battery temperature THBAT, the battery charging and discharging current IBAT, the battery voltage VBAT, and the like.

Figure 4:
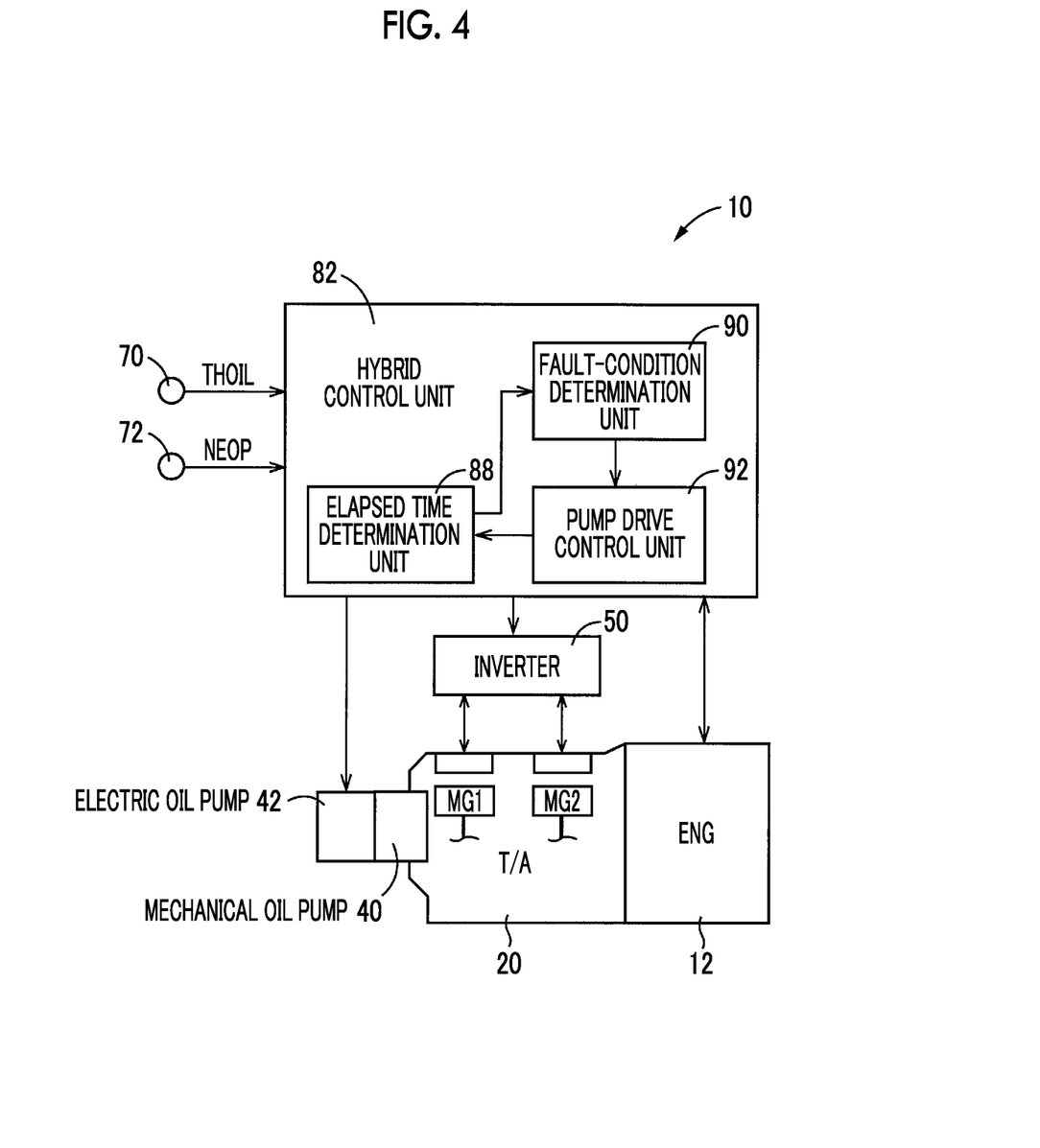
FIG. 4 is a functional block diagram that illustrates a relevant portion of control functions of the electronic control unit shown in FIG. 1.

FIG. 4 is a functional block diagram that illustrates a relevant portion of control functions of the electronic control unit 80. As shown in FIG. 4, hybrid control means, that is, a hybrid control unit 82, for example, selectively establishes a mode drive mode, an engine drive mode (steady drive mode), an assist drive mode (acceleration mode), or the like, in response to a traveling state. In the motor drive mode, the vehicle 10 travels by using only the second electric motor MG2 as a driving source for propelling the vehicle 10. In the engine drive mode (steady drive mode), the vehicle 10 travels by using at least the engine 12 as a driving source for propelling the vehicle 10 by causing the first electric motor MG1 to generate electric power to take charge of reaction force against the power of the engine 12 and transmit engine direct torque to the output gear 14 (drive wheels 38) and driving the second electric motor MG2 with the generated electric power of the first electric motor MG1 to transmit torque to the output gear 14. In the assist drive mode (acceleration mode), the vehicle 10 travels by further adding the driving force of the second electric motor MG2 using electric power from the electrical storage device 52 in the engine drive mode.

Control in the above-described engine drive mode will be more specifically described as an example. The hybrid control unit 82 operates the engine 12 in a high-efficiency operating range, and controls the speed ratio γ0 of the transmission unit 20 by varying the distribution of driving force between the engine 12 and the second electric motor MG2 and the reaction force caused by power generation of the first electric motor MG1 such that the distribution and the reaction force become optimal. For example, the hybrid control unit 82 calculates a target output (required output) of the vehicle 10 on the basis of the accelerator operation amount Acc and the vehicle speed VS (km/h). The hybrid control unit 82 calculates a required total target output on the basis of the target output and a charging required value (charging required power). The hybrid control unit 82 calculates a target engine power PE* in consideration of a transmission loss, an auxiliary load, the assist torque of the second electric motor MG2, and the like, such that the total target output is obtained. The hybrid control unit 82 controls the engine 12 to the engine rotation speed NE and the engine torque TE at which the target engine power PE* is obtained, and controls the amount of electric power that is generated by the first electric motor MG1.

The hybrid control unit 82 operates the electric oil pump 42 during a stop of the engine 12. The hybrid control unit 82 starts up the electric oil pump 42, and determines whether a rotation speed NEOP (rpm) and an oil temperature THOIL (° C.) after a lapse of a predetermined time fall within a normal-condition side with respect to a normal-condition determination threshold stored in advance. When the rotation speed NEOP (rpm) and the oil temperature THOIL (° C.) fall within a fault-condition side with respect to the normal-condition determination threshold and it is determined that there is a fault in the electric oil pump 42 or the oil passage, an electric oil pump fault flag is set to an on state, and then the electric oil pump 42 is stopped. For this reason, the hybrid control unit 82 includes an elapsed time determination unit 88, a fault-condition determination unit 90 and a drive control unit 92.

The elapsed time determination unit 88 determines whether the electric oil pump 42 has been started up on the basis of, for example, whether a startup command has been issued from the drive control unit 92, which controls the driving of the electric oil pump 42, to the electric oil pump 42, and determines whether an elapsed time after a startup of the electric oil pump 42 is longer than or equal to a preset time. The fault-condition determination unit 90 determines whether the rotation speed NEOP (rpm) of the electric oil pump 42 and the oil temperature THOIL (° C.) fall within the normal-condition side with respect to the normal-condition determination threshold stored in advance.

Figure 5:
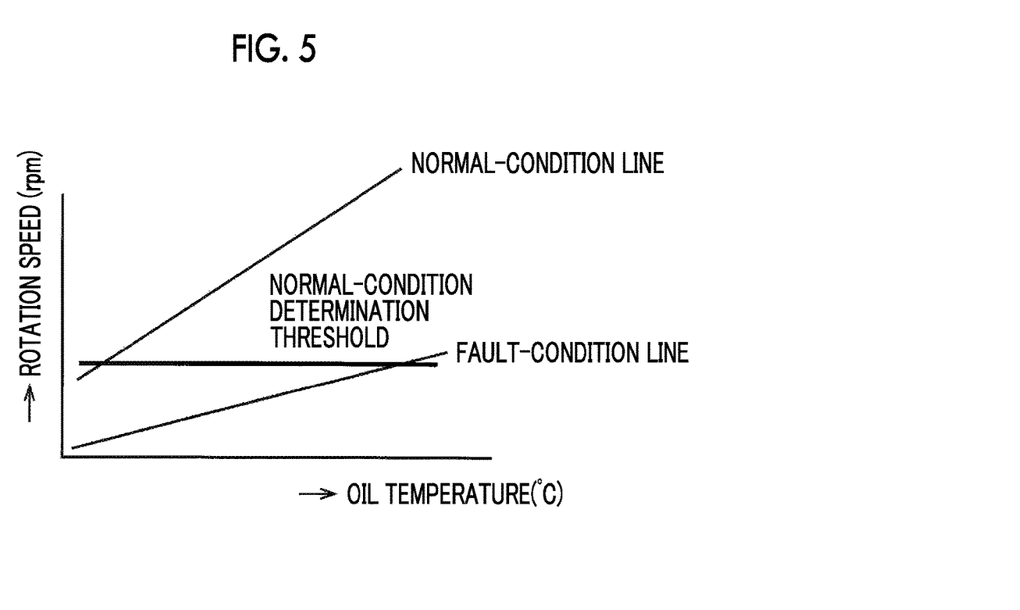
FIG. 5 is a graph that illustrates a threshold for determining the operation states of an electric oil pump and check valve, shown in FIG. 2.

FIG. 5 shows a method of, when it is determined that there is a fault in the electric oil pump 42 or in the oil passage, determining whether there is a fault on the basis of whether the rotation speed NEOP (rpm) of the electric oil pump 42 is lower than a certain normal-condition determination threshold set in advance. The normal-condition determination threshold indicated by the straight line is parallel to the oil temperature axis, that is, it is determined whether there is a fault in the electric oil pump 42 or in the oil passage on the basis of whether the rotation speed NEOP (rpm) of the electric oil pump 42 is higher than or equal to the normal-condition determination threshold.

FIG. 5 shows two oblique straight lines other than the normal-condition determination threshold. The lower-side oblique straight line (fault conditions) shows the relationship between the oil temperature THOIL (° C.), measured by the oil temperature sensor 70, and the rotation speed NEOP (rpm) of the electric oil pump 42 at the time when the electric oil pump 42 normally operates and oil is normally supplied through the oil passage via the third check valve V3 from the electric oil pump 42 to the oil temperature sensor 70 in a state where the first check valve V1 is not open and the third check valve V3 is open. The upper-side oblique straight line (normal conditions) shown in FIG. 5 shows the relationship between the oil temperature THOIL (° C.), measured by the oil temperature sensor 70, and the rotation speed NEOP (rpm) of the electric oil pump 42 at the time when the electric oil pump 42 normally operates and oil is normally supplied through the oil passage via the first check valve V1 from the electric oil pump 42 to the oil temperature sensor 70 in a state where the first check valve V1 is open. These lines for normal conditions and fault conditions are approximately shown by straight lines for the sake of easy illustration; however, these lines may be gentle curves.

In FIG. 5, it is determined whether there is a fault in the electric oil pump 42 on the basis of whether the rotation speed NEOP (rpm) of the electric oil pump 42 is higher than or equal to the normal-condition determination threshold that does not vary with an oil temperature. For example, when the oil temperature THOIL (° C.) is high, the viscosity of oil decreases, so the rotation speed NEOP (rpm) of the electric oil pump 42 increases. Although it should be originally determined as fault conditions, it can be determined as normal conditions since the rotation speed NEOP (rpm) is high. When the oil temperature THOIL (° C.) is low, the viscosity of oil increases, and the rotation speed NEOP (rpm) of the electric oil pump 42 decreases. Although it should be originally determined as normal conditions, it can be determined as fault conditions since the rotation speed NEOP (rpm) is low.

Figure 6:
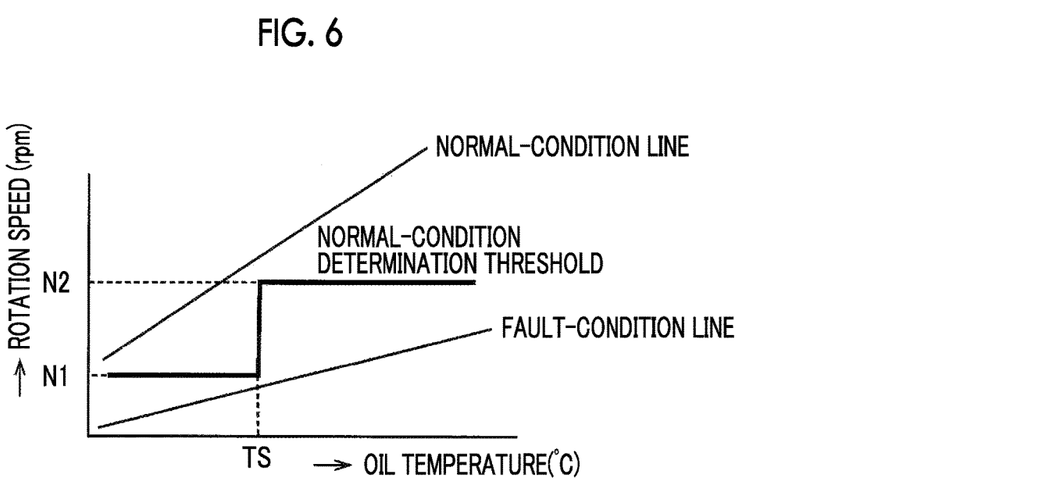
FIG. 6 is a graph that illustrates another example of a threshold for determining the operation states of the electric oil pump and check valve, shown in FIG. 2.

FIG. 6 shows an example of determining whether there is a fault in the electric oil pump 42 or in the oil passage on the basis of the rotation speed NEOP (rpm) of the electric oil pump 42 and the oil temperature THOIL (° C.) measured by the oil temperature sensor 70. In FIG. 6, a normal-condition determination threshold that varies in a stepwise manner between N2 and N1 at a temperature TS (° C.) for the rotation speed NEOP (rpm) of the electric oil pump 42 is set in a region between the normal-condition line and the fault-condition line. By setting the normal-condition determination threshold in this region, if there occur variations in the oil temperature detected by the oil temperature sensor 70 and, as a result, a detected oil temperature is higher than an actual temperature, it is highly likely to be determined as fault conditions (safe determination). In the case where a detected temperature is lower than an actual temperature, when the rotation speed NEOP (rpm) of the electric oil pump 42 is lower than N1, it is determined as fault conditions irrespective of a detected oil temperature; whereas, when the rotation speed NEOP (rpm) of the electric oil pump 42 exceeds N1, it is determined as fault conditions when the measured oil temperature THOIL (° C.) is higher than or equal to the temperature TS (° C.), so, even when there occur variations in oil temperature detected by the oil temperature sensor 70, it is less likely to be erroneously determined as normal conditions under fault conditions. An example of dividing the rotation speed NEOP (rpm) of the electric oil pump 42 into two steps, that is, N2 and N1, is described. Instead, a stepwise normal-condition determination threshold having two or more steps may also be used by further increasing N. In this case, it is also possible to further reduce the possibility that it is determined as normal conditions under fault conditions. The normal-condition determination threshold is stored in the hybrid control unit as a map in advance. The fault-condition determination unit 90 determines whether the oil temperature THOIL (° C.) detected by the oil temperature sensor 70 and the rotation speed NEOP (rpm) of the electric oil pump 42, detected by the rotation speed sensor 72, fall below the normal-condition determination threshold.

Figure 7:
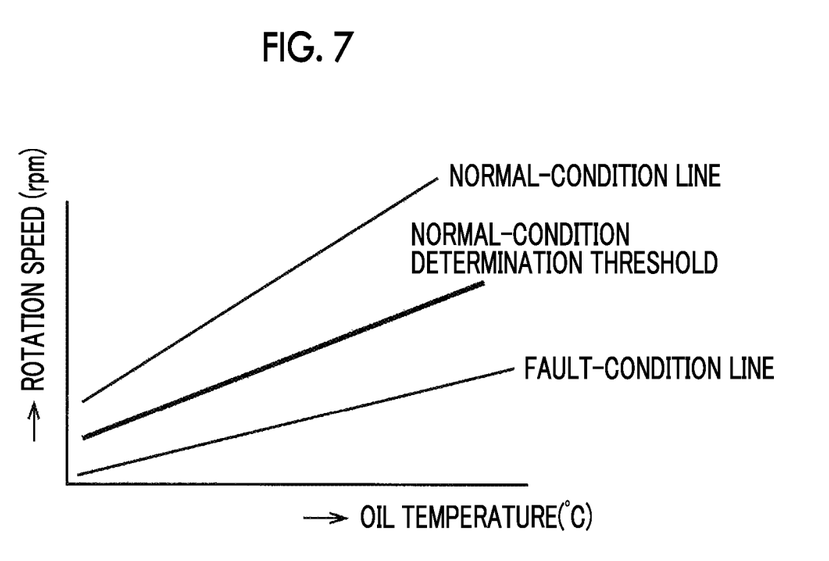
FIG. 7 is a graph that illustrates further another example of a threshold for determining the operation states of the electric oil pump and check valve, shown in FIG. 2.

FIG. 7 is an example in which the normal-condition determination threshold is set in an oblique straight line within a region between the normal-condition line and the fault-condition line. This example is able to further reduce the possibility that it is erroneously determined as normal conditions under fault conditions as compared to when the normal-condition determination threshold is set in a stepwise manner. An example in which the normal-condition determination threshold is set in a straight line is described. Instead, a normal-condition determination threshold having a curved shape may also be used. The normal-condition determination threshold is stored in the hybrid control unit as a map in advance. The fault-condition determination unit 90 determines whether the oil temperature THOIL (° C.) detected by the oil temperature sensor 70 and the rotation speed NEOP (rpm) of the electric oil pump 42, detected by the rotation speed sensor 72, fall below the normal-condition determination threshold.

Figure 8:
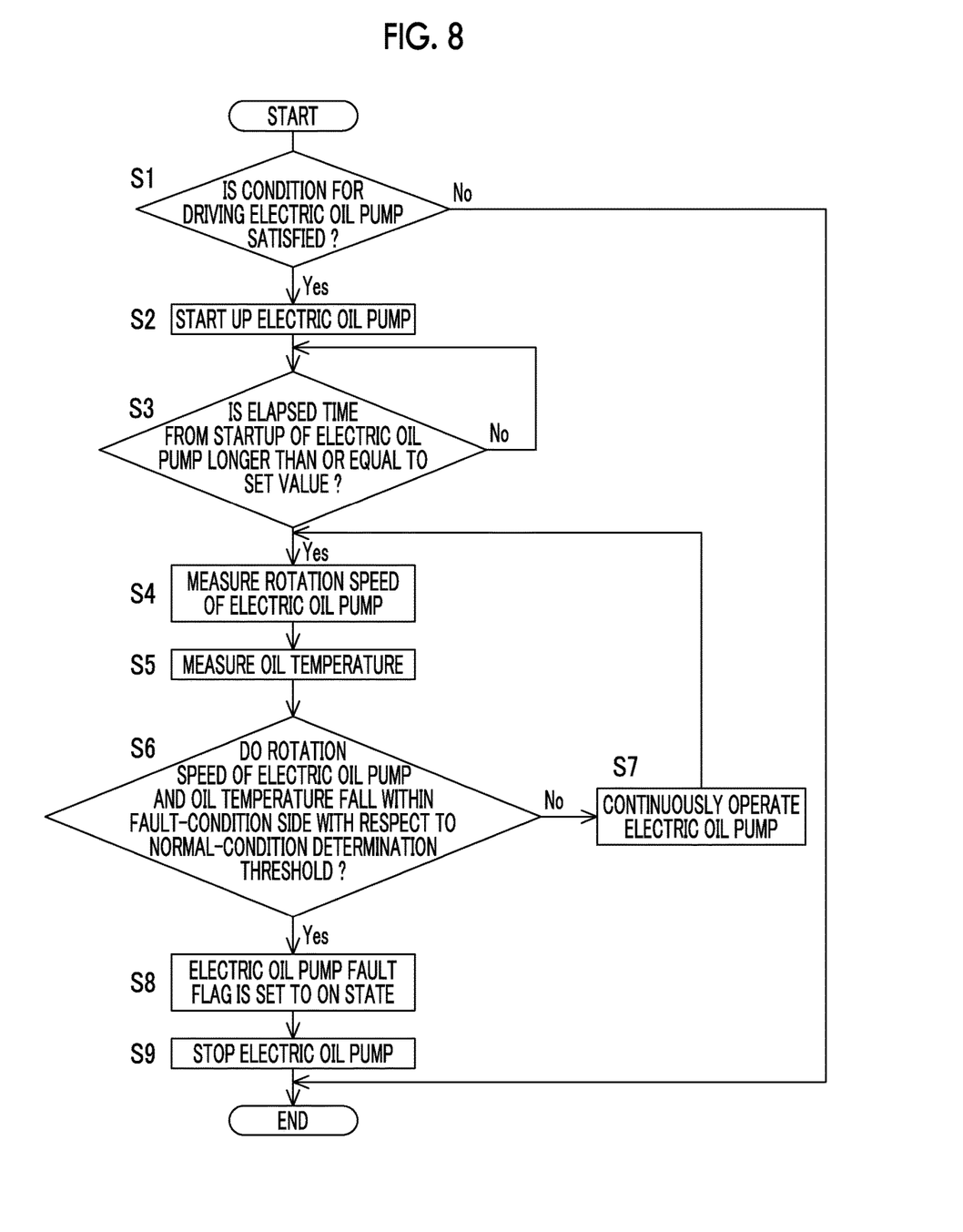
FIG. 8 is a flowchart that illustrates a relevant portion of control operations of the electronic control unit shown in FIG. 1.

FIG. 8 is a flowchart that illustrates a relevant portion of determination operation as to whether there is a fault in the electric oil pump 42 by using the normal-condition determination threshold shown in FIG. 6 or FIG. 7. This flowchart is repeatedly executed.

In FIG. 8, initially, in step (hereinafter, step is omitted) S1 corresponding to the hybrid control unit 82, it is determined whether the condition for driving the electric oil pump 42 is satisfied. When negative determination is made in S1, the routine is ended. When affirmative determination is made in S1, in S2 corresponding to the drive control unit 92, for example, an electric oil pump startup command is output from the hybrid control unit 82, and a signal for driving the electric oil pump 42 is further output from the drive control unit 92, with the result that the electric oil pump 42 is started up.

In S3 corresponding to the elapsed time determination unit 88, it is determined whether an elapsed time from the startup of the electric oil pump 42 is longer than or equal to a predetermined time. The predetermined time is determined in advance by experiment in order to carry out measurement for determining the operating state of the electric oil pump 42 at a point in time at which a relatively instable transitional state just after the startup of the electric oil pump has been passed. When affirmative determination is made in S3, that is, when it is determined that the time up to when the operation of the electric oil pump 42 becomes stable has elapsed, in S4 corresponding to the rotation speed sensor 72 of the electric oil pump 42, the rotation speed NEOP (rpm) of the electric oil pump 42 is input to the fault-condition determination unit 90. In S5 corresponding to the oil temperature sensor 70, the oil temperature THOIL (° C.) is input to the fault-condition determination unit 90.

In S6 corresponding to the fault-condition determination unit 90, it is determined whether the input rotation speed NEOP (rpm) of the electric oil pump and the input oil temperature THOIL (° C.) fall within a fault-condition side with respect to the normal-condition determination threshold that is stored in the hybrid control unit 82. When negative determination is made, the operation of the electric oil pump is continued in S7 corresponding to the drive control unit 92, and it is repeatedly determined in S4 to S6 whether the input rotation speed NEOP (rpm) of the electric oil pump and the input oil temperature THOIL (° C.) fall within the fault-condition side with respect to the normal-condition determination threshold. When it is determined that the input rotation speed NEOP (rpm) of the electric oil pump and the input oil temperature THOIL (° C.) fall within the fault-condition side with respect to the normal-condition determination threshold, the electric oil pump fault flag is set to the on state in S8 corresponding to the fault-condition determination unit 90, and detailed measures (not shown) under fault conditions are taken. In S9 corresponding to the drive control unit 92, the electric oil pump 42 is stopped when a signal for stopping the electric oil pump 42 is output from the drive control unit 92.

Therefore, in determining whether there is a fault in the electric oil pump 42 or in the oil passage, with a determination method to which the oil temperature THOIL (° C.) is added in addition to a generally used method of determining whether there is a fault in the electric oil pump 42 or in the oil passage on the basis of whether the rotation speed NEOP (rpm) of the electric oil pump 42 is a constant rotation speed set in advance, it is possible to prevent erroneous fault determination that can occur when the oil temperature is higher than or equal to a certain temperature or lower than or equal to a certain temperature. That is, by providing a normal-condition determination threshold in a region between a fault-condition line and a normal-condition line, it is possible to prevent erroneous fault determination that can occur when the oil temperature is higher than or equal to a certain temperature or lower than or equal to a certain temperature in a method of determining whether there is a fault in the electric oil pump 42 or in the oil passage on the basis of whether the rotation speed NEOP (rpm) of the electric oil pump 42 is a constant rotation speed set in advance.

By providing a normal-condition determination threshold in a region between a fault-condition line and a normal-condition line, even when there occurs a difference between an actual oil temperature and a measured oil temperature THOIL (° C.) due to variations in the oil temperature sensor 70, it is possible to reduce erroneous determination. When there occur fluctuations in the rotation speed NEOP (rpm) of the electric oil pump 42 due to variations in the rotation speed sensor 72 as well, similar advantageous effects are expected.

The embodiment is described in detail with reference to the accompanying drawings, and the embodiment is also applied to other embodiments.

For example, generally, the mechanical oil pump 40 is less likely to undergo a decrease in pump rotation speed and clogging of the corresponding check valve than the electric oil pump 42. However, a check valve that similarly functions as the third check valve V3 according to the present application may be provided in parallel with the second check valve V2.

For example, it is determined whether there is a fault on the basis of the rotation speed NEOP (rpm) of the electric oil pump 42 and the oil temperature THOIL (° C.). Instead, it may be determined whether there is a fault on the basis of the flow speed or flow rate of oil flowing through the oil passage, and the oil temperature THOIL (° C.).

For example, in FIG. 6, the normal-condition determination threshold for determining a fault is configured to vary in a stepwise manner between two rotation speeds N1 and N2 at one oil temperature TS. Instead, a normal-condition determination threshold may have two steps of N1 and N2 straight lines connected by a straight line or a curve that gently varies from the rotation speed N1 to the rotation speed N2 within a temperature range of oil temperature having a certain width.

For example, in FIG. 7, the normal-condition determination threshold for determining a fault is a single oblique straight line. Instead, a normal-condition determination threshold may be expressed in a straight line or a curve that has two rotation speeds N1 and N2 at one oil temperature TS and that increases from N2 in rotation speed and oil temperature and reduces from N1 in rotation speed and oil temperature.

Although other alternative embodiments are not illustrated, the embodiment may be implemented in modes including various modifications without departing from the scope of the invention.

What is claimed is:
1. A power transmission system for a vehicle, the power transmission system comprising:
an electric oil pump;

a mechanical oil pump connected in parallel with the electric oil pump;
a first check valve provided in a first discharge oil passage of the electric oil pump;
a second check valve provided in a second discharge oil passage of the mechanical oil pump;
an oil temperature sensor provided at a merging portion downstream of the first check valve and the second check valve;
a third check valve provided at a position upstream of the oil temperature sensor in parallel with the first check valve; and
an electronic control unit (ECU) configured to determine that there is a fault in the electric oil pump or the first discharge oil passage of the electric oil pump, when a rotation speed of the electric oil pump is lower than a predetermined fault determination rotation speed,
wherein:
the predetermined fault determination rotation speed is higher than a rotation speed of the electric oil pump in a faulty condition for an oil temperature measured by the oil temperature sensor at the time when the electric oil pump normally operates and oil is normally supplied through an oil passage that passes through the third check valve from the electric oil pump to the oil temperature sensor in a state where the first check valve is not open and the third check valve is open, and
the predetermined fault determination rotation speed is lower than a rotation speed of the electric oil pump in a normal condition for an oil temperature measured by the oil temperature sensor at the time when the electric oil pump normally operates and oil is normally supplied through an oil passage that passes through the first check valve from the electric oil pump to the oil temperature sensor in a state where the first check valve is open.

2. The power transmission system according to claim 1, wherein
a flow resistance of an oil passage in which the third check valve is provided is larger than a flow resistance of an oil passage in which the first check valve is provided.

3. The power transmission system according to claim 1, wherein
a minimum valve open pressure difference of the third check valve is smaller than a minimum valve open pressure difference of the first check valve.

* * * * *